A. FRISCH.
DEVICE FOR RECORDING THE READINGS OF METERS.
APPLICATION FILED MAY 14, 1915.
1,223,686.
Patented Apr. 24, 1917.
2 SHEETS—SHEET 2.
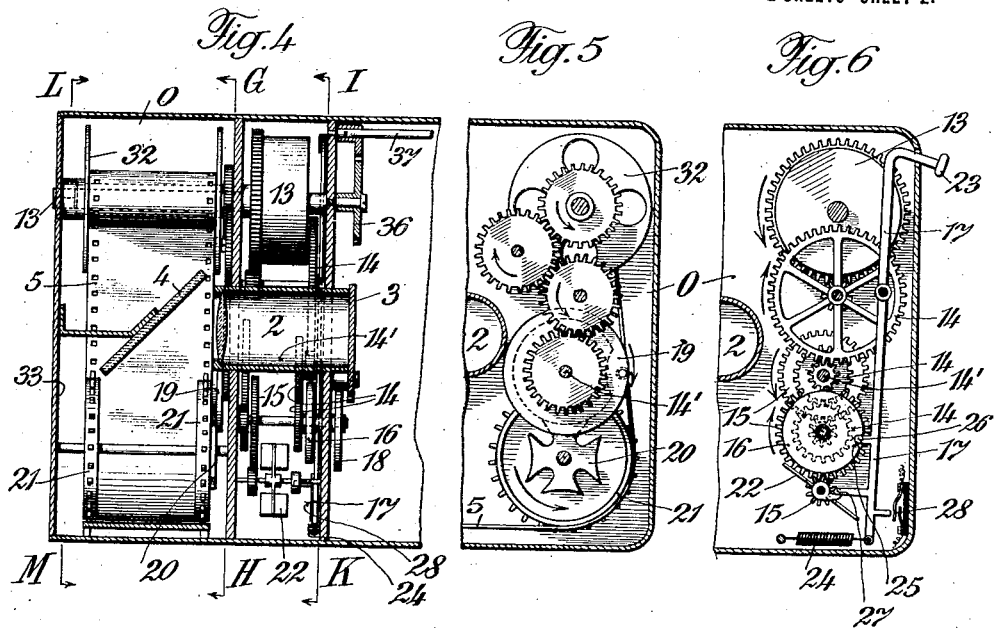
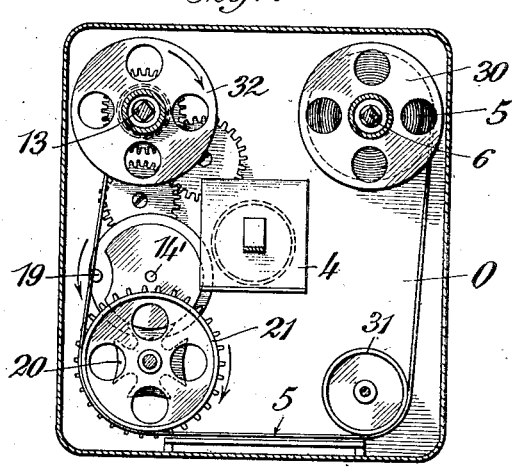
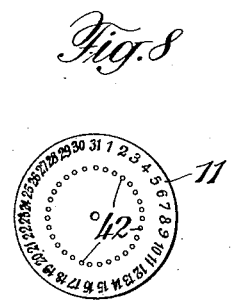
Inventor:
August Frisch,
By 
Atty.

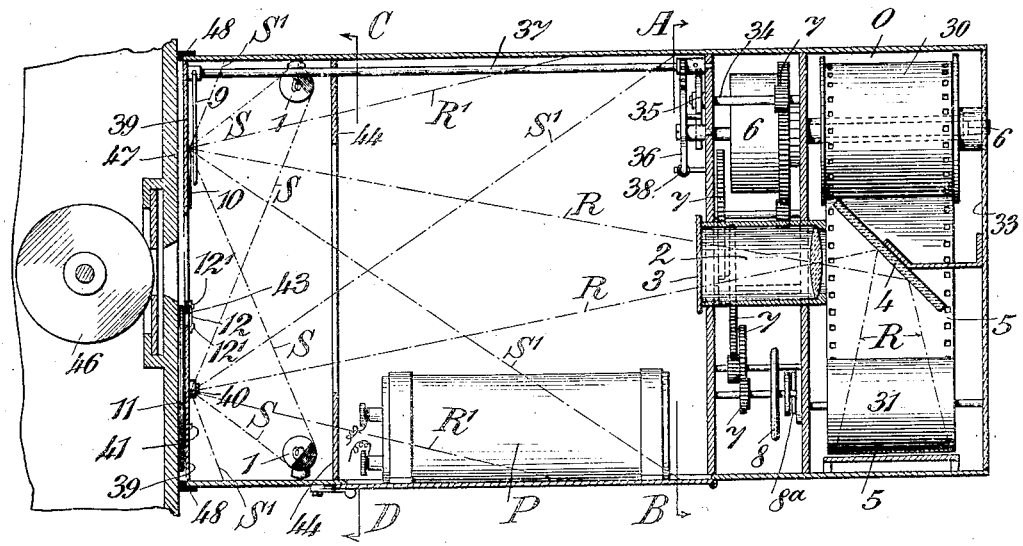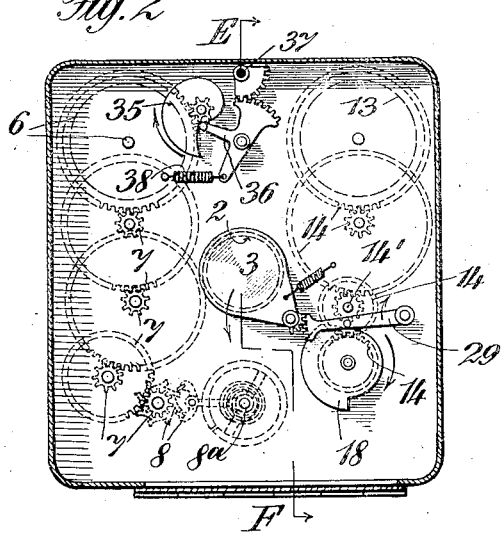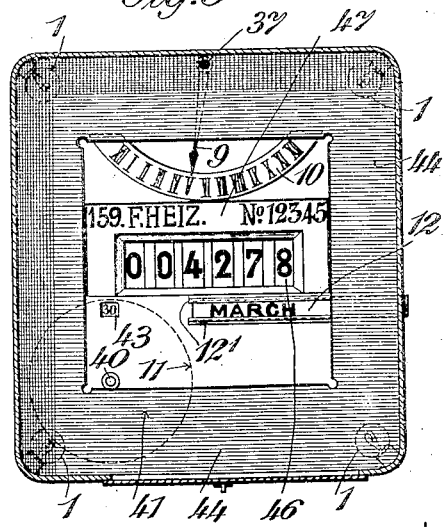

UNITED STATES PATENT OFFICE.

AUGUST FRISCH, OF ZURICH, SWITZERLAND, ASSIGNOR TO THE FIRM OF A. FRISCH & CO., OF ZURICH, SWITZERLAND.

DEVICE FOR RECORDING THE READINGS OF METERS.

1,223,686.  Specification of Letters Patent.  Patented Apr. 24, 1917.

Application filed May 14, 1915. Serial No. 28,065.

*To all whom it may concern:*

Be it known that I, AUGUST FRISCH, a citizen of the Republic of Switzerland, residing at Zurich, Switzerland, have invented new and useful Improvements in Devices for Recording the Readings of Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The reading of meters for water, gas, electricity and the like, which serves as a base for the calculation of the consumption, is generally made by persons, who do not possess the desired skill which can always be relied upon. The uncertainty connected with the reading made by such persons causes frequent annoyance to the accountant and is in many cases the cause of unpleasant quarrels between the contractor and consumer.

The present invention has for its object to eliminate these drawbacks. According to this invention the standing of the meter to be ascertained is not read and entered into a book, but is photographed, so that the accountant may determine the standing, which in this case can be checked at any time. If the arrangement is such that besides the consumption figures there appear on the photograph also the time at which the photograph was taken and all other necessary particulars, the man commissioned to make the photographs has only to go from one meter to the other and take the photographs according to the directions received, so that at the end of his day's work he has only to give over to the accountant the device used, which contains the pictures taken during the day. The accountant then attends to the developing and fixing of the pictures and from the particulars shown on the photographs prepares the bills to be sent to the consumers. Should any differences of opinion arise between the contractor and the consumer, the reading at issue may be checked at any time, so that any reason for quarreling is eliminated.

A device fulfilling these requirements is shown by way of example in the accompanying drawings, in which—

Figure 1 is a vertical longitudinal section through the middle of the camera;

Fig. 2 is a cross section on the line A—B of Fig. 1;

Fig. 3 is a corresponding section on the line C—D of Fig. 1,

Fig. 4 is a cross section on the line E—F of Fig. 2,

Fig. 5 is a cross section on the line G—H of Fig. 4,

Fig. 6 is a cross section on the line I—K of Fig. 4 and

Fig. 7 is a cross section on the line L—M of Fig. 4;

Fig. 8 is a detail.

The device shown by way of example comprises three main parts, *i. e.*—

*a.* the optical mechanism consisting of the electric lamps 1, the lens 2 and shutter 3 of the objective, the plane mirror 4 and the film-strip 5;

*b.* the time recording mechanism consisting of a spring casing 6, a train of toothed wheels 7 operatively connected to said casing, an escapement device 8 operatively connected to a wheel of said train 7 and a balance $8^a$, a cam disk 35 operatively connected to a wheel of the train 7, a hand 9 receiving its motion from the disk 35, a dial-plate 10, a day-plate 11 and a month-strip 12;

*c.* the shutter and film actuating mechanism consisting of a spring casing 13, trains of toothed wheels 14 and 15 operatively connected to said casing 13, a locking disk 16, a releasing lever 17 acting at the same time as a switch for the light current, a cam disk 18, a wheel 19 provided with only one pin, a Geneva gear 20, a feeding drum 21 for the film and an air vane governor 22.

Inside the camera O there is also arranged an electric storage battery P connected to the electric circuit of the lamps 1 provided inside a box formed integrally with the camera O. The arrangement of these lamps within said box can be best seen in Figs. 1 and 3. Fig. 1 shows that the rays S emitted from these lamps fall at an angle upon the light reflecting surface, which prevents the reflected rays S' from falling into the lens 2. The angle of the lens 2 is such that when photographing the picture plane, containing the hand 9, dial plate 10, plate 11, and strip 12, the lamps 1 are not included in the field of the lens indicated between the lines R, R.

Furthermore, the reflected rays, indicated by the lines R', S', from the source of light, do not enter the lens.

Upon pressing of the button 23 of the lever 17 the locking disk 16 and the governor 22 are released and the trains of wheels 14 and 15, respectively, impart a rotary movement to said parts 16 and 22. Upon the disk 16 having completed one revolution the pin 26 provided on the lever 17 engages, owing to the action of the spring 24, a notch 25 provided in said disk 16, thus preventing a further rotation of the latter. In the meantime the governor 22 carries out a certain number of revolutions and is finally stopped by a pin 27 also provided on the lever 17. Simultaneously with the movement of the lever 17 releasing the shutter and film actuating mechanism the terminals 28 are brought into contact thus closing the lighting current and illuminating the surface to be reproduced on the film. At the same time the cam disk 18 makes one revolution, opening and closing the shutter 3 during the first half of this revolution by means of the lever 29. By regulating the speed of the shutter and film actuating mechanism in an appropriate manner the time of exposure may be made of such a duration, that the picture, projected through the lens 2 and by means of the plane mirror 4 upon the sensitive film strip 5, appears on the latter with the desired sharpness. By employing the mirror 4 I am able to arrange the film-roller in a more suitable manner; it is not intended to attain any other purpose with said mirror.

During the second half of the revolution of the cam disk 18 a movement is imparted to the wheel 19 provided with only one pin and mounted on the shaft 14' having the same angular velocity as the wheel 16. The wheel 19 imparts by means of the Geneva gear 20 a feeding movement to the drum 21, which is rotated somewhat over the amount corresponding to the length of a picture. The supply drum 30, the guide roller 31 and the take up drum 32 with its drive correspond to the parts used for the same purpose in moving picture apparatus, the only difference being that the supply drum 30 and the take up drum 32 are arranged on the extended shafts of the spring casings 6 and 13. These shafts pass through the rear wall 33 of the camera O and their ends have a square cross section, in order that the springs may be wound up.

Upon the completion of a revolution of the locking disk 16 the lever 17 is returned, as already stated, into its initial position, the movement mechanism is stopped, the light circuit is interrupted and the film strip is kept in a position to produce a new picture.

The continually rotating time recording mechanism imparts to the shaft 34 one revolution in twelve hours. The cam disk 35 is mounted on said shaft 34, the friction between these two parts causing the disk 35 to rotate. The latter acts by means of the lever 36 upon the shaft 37 carrying the hand 9, which is caused to describe an arc on the dial-plate 10. The latter is divided into twelve parts XII to XII, which correspond to the hours of the day. As soon as the cam disk 35 has completed one revolution the spring 38 acting upon the lever 36 returns the hand 9 into its initial position. It will be seen that in the embodiment of my invention illustrated in the drawings I have not provided any hand for showing the minutes; such a hand can, however, easily be provided for if necessity arises.

The disk 11 divided into thirty one parts and provided with the numbers 1 to 31 can be rotated by hand on a pin 40 inserted into the front wall 39 of the camera O. Said disk 11 can be fixed in a certain position by means of a pin 41 passing through the wall 39 and one of the holes 42 provided in the disk 11. A hole 43 in the wall 39 permits the day of the month appearing through said hole 43 to be recorded in the photograph. The name of the month to be recorded is written on a small strip 12 guided in pieces $12^1$ fixed to the inside of the wall 39. The disk 11 and the strip 12 are so arranged in the device, that any unauthorized displacement of them is prevented.

A partition or diaphragm 44 provided with an opening serves as a frame for the photographic pictures.

The number of the measuring instrument and the number and name of the consumer are provided on the measuring instrument itself, while, as already stated, the dial-plate 10, the day-disk 11 and the month-strip 12 are arranged on the front wall 39 connected to the camera O.

In order that the device may be easily brought into the right position with regard to the measuring instrument 46, 47 I provide on the latter projecting parts 48.

As a source of light I preferably use, as shown, incandescent lamps, which are placed in parallel.

I wish it to be understood, that the device forming the subject matter of this invention may also be subjected to other modifications than those shown on the drawings without departing from the scope of the invention.

Having now described my invention what I claim as new and desire to secure by Letters Patent is:

1. A device for recording the readings of meters, comprising a casing, a camera located within the latter, illuminating means in the casing out of the field of the camera lens adapted to illumine the indicators of a meter, time indicating means in the casing extending into the field of the camera lens and the light rays of the illuminating means, and clock mechanism for operating the time indicator located out of the field of the lens.

2. A device for recording the readings of meters, comprising a casing, a camera located within the latter, illuminating means in the casing out of the field of the camera lens adapted to illumine the indicators of a meter, hour, day, and month indicating means in the casing extending into the field of the camera lens and light rays of the illuminating means, and clock mechanism for operating the hour indicating means located out of the field of the lens.

3. A device for recording the readings of meters, comprising a casing, a camera located within the latter, illuminating means in the casing out of the field of the camera lens adapted to illumine the indicators of a meter, an hour indicating sector mounted on the front of the casing and extending into the field of the camera lens and the light rays of the illuminating means, a hand extending over the sector, and timing means located in the casing out of the field of the lens to oscillate the hand.

4. A device for recording the readings of meters, comprising a casing, a camera located within the latter, illuminating means in the casing out of the field of the camera lens adapted to illumine the indicators of a meter, an hour indicating sector mounted on the front of the casing and extending into the field of the camera lens and the light rays of the illuminating means, a hand extending over the sector, a clock mechanism located in the camera above the lens, and a rod carrying the hand extending from the clock mechanism out of the field of the lens.

5. A device for recording the readings of meters comprising, a casing, a camera located therein, an illuminating means in the casing adapted to illumine the indicators of a meter, an hour indicating sector located in the casing within the field of the lens and the light rays of the illuminating device, a clock mechanism located in the camera, a shaft extending from the camera to the front of the casing, an indicating hand connected to the shaft in front of the sector, a toothed sector on the shaft, a pivoted toothed sector in mesh with the sector on the shaft, and a cam rotated by the clock mechanism adapted to oscillate the pivoted sector.

In testimony that I claim the foregoing as my invention I have signed my name in presence of two subscribing witnesses.

AUGUST FRISCH.

Witnesses:
M. C. PIERCE,
ARNOLD LEHNER.